(No Model.)  
W. W. & F. M. MULLEN.  
GRAIN DRILL.  
No. 411,528.  
Patented Sept. 24, 1889.
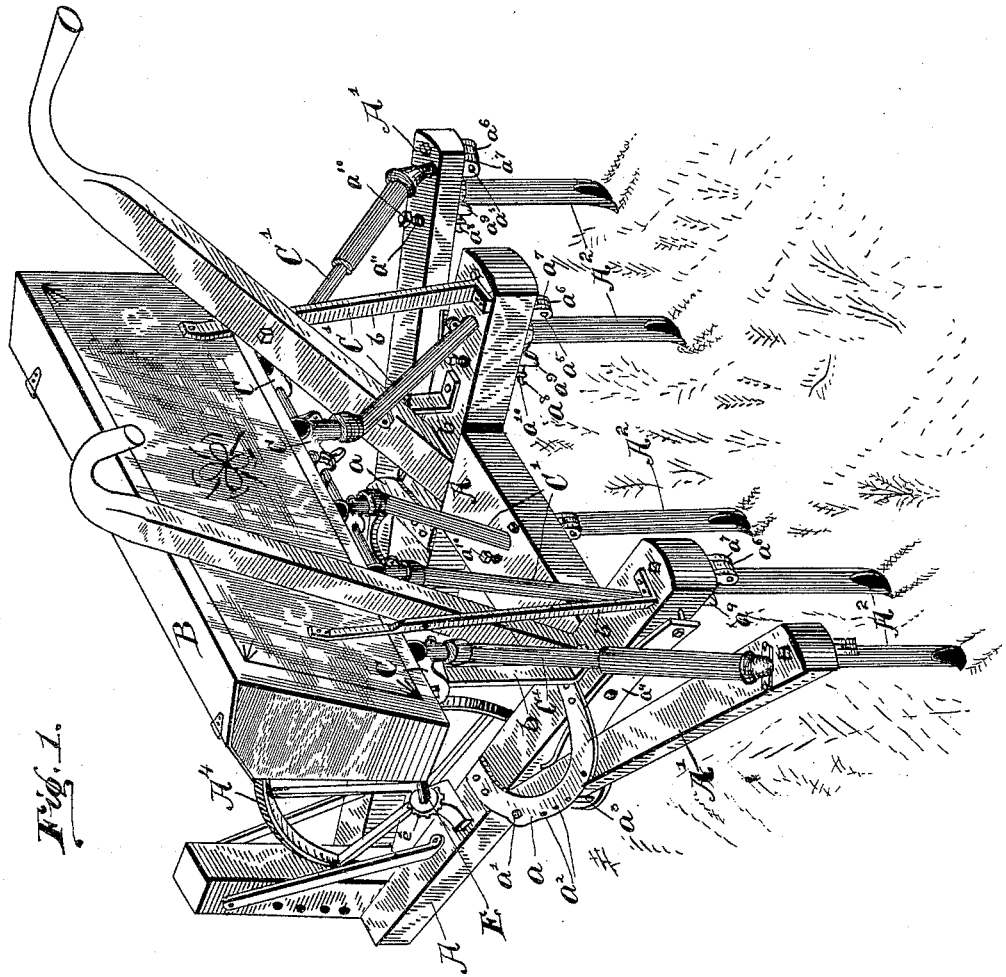

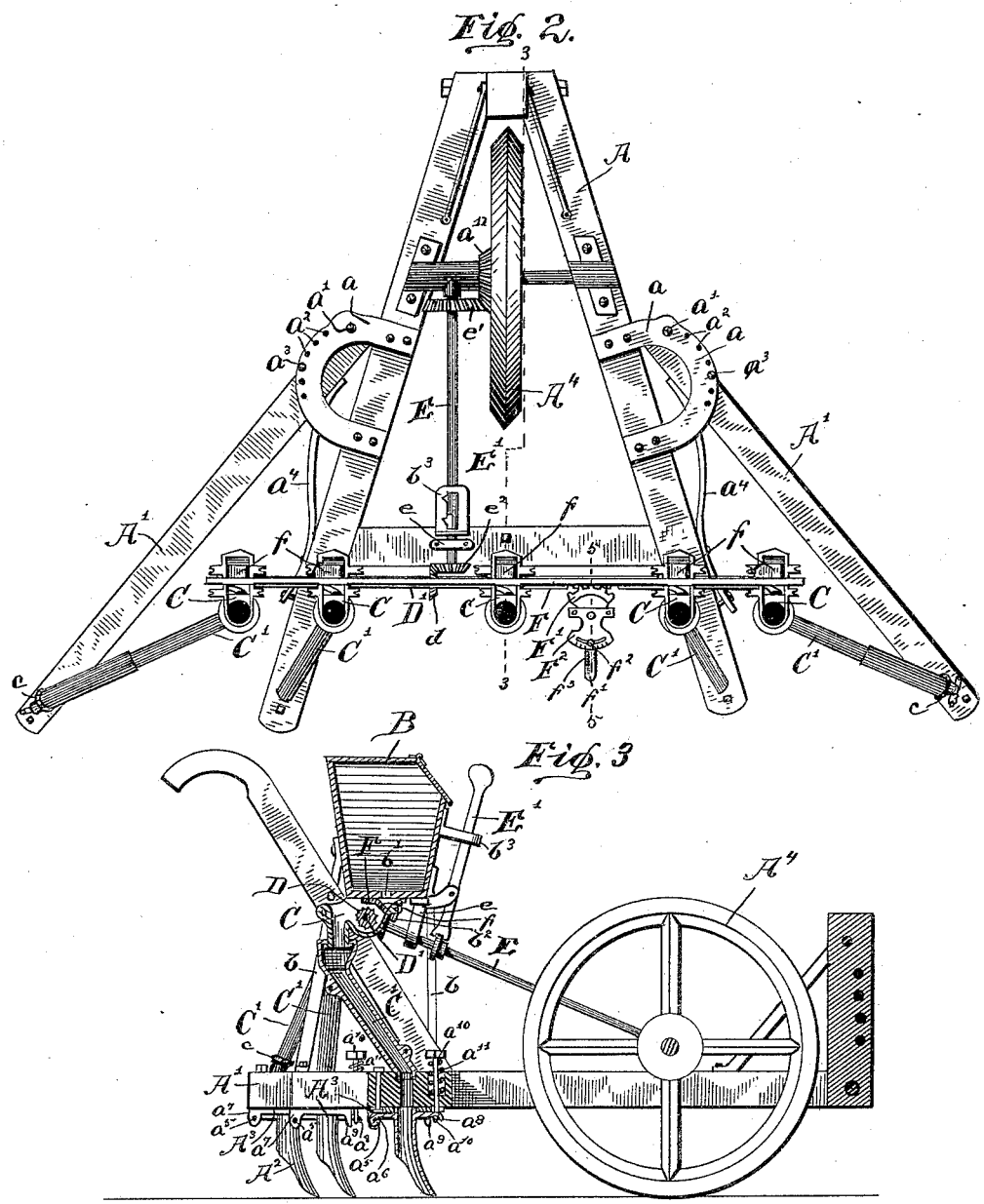

UNITED STATES PATENT OFFICE.

WINFIELD W. MULLEN AND FRANCIS M. MULLEN, OF BUNKER HILL, INDIANA.

GRAIN-DRILL.

SPECIFICATION forming part of Letters Patent No. 411,528, dated September 24, 1889.

Application filed March 14, 1889. Serial No. 303,281. (No model.)

*To all whom it may concern:*

Be it known that we, WINFIELD W. MULLEN and FRANCIS M. MULLEN, citizens of the United States, residing at Bunker Hill, in the county of Miami and State of Indiana, have invented certain new and useful Improvements in Grain-Drills, of which the following is a specification.

Our said invention consists in various improvements in the details of construction of grain-drills, by which the drill is rendered more simple and durable in construction and more perfect in operation and result, as will be hereinafter particularly described and claimed.

Referring to the accompanying drawings, which are made a part hereof, and on which similar letters of reference indicate similar parts, Figure 1 is a perspective view of a grain-drill embodying our improvements and illustrating the particular form of drill to which they are especially adapted; Fig. 2, a top or plan view of the same, the hopper and its supporting-braces being omitted; Fig. 3, a longitudinal vertical section on the dotted line 3 3 in Fig. 2, and Fig. 4 a detail section on the dotted line 5 5 in Fig. 2.

In said drawings, the portion marked A represents the frame-work; B, the hopper; C, the seed-cups on the bottom of said hopper; D, the feed-rolls; E, the main driving-shaft, and F the cut-off or feed-regulator.

The frame A is in most particulars of a common construction, consisting of a V-shaped frame-work arranged in a suitable manner to support the various mechanism. It is provided with spring-mounted side wings A', as in our patent of January 4, 1887, No. 355,462, except that the hinges $a$, by which they are connected to the main frame, are of a novel construction, consisting of substantially semicircular or U-shaped bars bolted securely at each end to the side pieces of the main frame and having a pivot-bolt $a'$ near their front portion, to which the front ends of said side wings are connected. A row of perforations $a^2$ are formed in the edge of the portion farthest from the main frame, and a stop-pin $a^3$ is provided in each hinge to be placed therein and secure said wing in the position desired. Thus when it is desired that said wings shall be secured near to the main frame said pin is inserted in the hole near the rear portion of the hinge farthest from the pivot-bolt, and when it is desired that they shall occupy a position farther from the main frame said pin is moved forward toward the pivot and inserted in the perforation, where it will secure the wings in the position desired, the springs $a^4$ operating to throw said wings out and hold them against the stop-pin. Said frame is provided on its under side near its rear end with the drill-teeth $A^2$, one being shown secured on each wing and three on the main frame, as in our patent above referred to. Said teeth are secured in position by a pivot $a^5$, which is inserted through a perforation in a rearwardly-projecting ear $a^6$, and downwardly-hanging-lips $a^7$, formed on the rear portion of the plate $A^3$, between which said ear is inserted, one of said plates $A^3$ being secured around each perforation in the frame provided for the drill-teeth connections. On the front side of each tooth, at or near its top, is formed a finger $a^8$ with a downwardly-hooked outer end, which extends between downwardly-hanging lips $a^9$ on the front end of the plate $A^3$, and engages with the eye of an eyebolt $a^{10}$, which extends up through the frame, and is surrounded by a spring $a^{11}$, interposed between its head and the top of the frame, or, preferably, the bottom of a socket formed in the top side of said frame for the purpose, as shown most plainly in Fig. 3. Said spring is only of sufficient elasticity to permit the tooth to bend back when it comes in contact with a stone or other matter too hard for it to pass through, thus preventing it from becoming broken, and then returning it immediately to operative position without retarding or interrupting the progress of the work. The main supporting and driving wheel $A^4$ is journaled by means of its shaft in suitable bearings on the front of the frame, and is formed with a miter gear-wheel $a^{12}$ on one side of its hub for connecting with the driving-shaft. The rim of this wheel is provided with a V-shaped outer face, as shown, experiment and use having proven that this form is better adapted to "clear" itself from earth and other matter that might adhere thereto and afford more power for driving the mechanism.

The hopper B is supported on the frame by standard-braces $b$ of a suitable form to connect therewith. It is preferably of the form shown, contracting longitudinally from bottom to top and expanding laterally from bottom to top, this form being very suitable, as it secures the required length on the bottom, but throws the weight of the load of seed which it carries into a position where it will least interfere with the easy and convenient handling of the machine by the operator. Suitable apertures $b'$ are formed in its bottom to permit the seed to fall into the seed-cups, as is usual.

The seed-cups C are secured on the bottom of the hopper beneath the apertures $b'$, each being formed with a short discharge-spout on its rear side, which is connected with the appropriate drill-tooth by a connecting-spout $C'$, the lower end of which is inserted in the perforation in the frame provided for the purpose, except those running to the wings, which are of a telescopic construction, as in our patent before mentioned, and are connected to a knuckle $c$, inserted in the frame to discharge into the drill-teeth, as shown.

The feed-rolls D are mounted on the shaft $D'$, which extends through each seed-cup, one roll being mounted thereon in each cup, extending transversely thereof. They are formed with diagonal corrugations in their peripheries, and operate to feed the seed from the cup into the discharge-spout on its rear side, as will be readily understood.

The driving-shaft E is journaled in suitable bearing $e$ on the hopper and in another on the frame near its front end. It is provided with a miter gear-wheel $e'$ on its front end, arranged to mesh with the gear-wheel $a^{12}$ on the hub of the main driving-wheel, and a similar wheel $e^2$ on its rear end, arranged to mesh with a miter gear-wheel $d$ on the shaft $d'$. Said gear-wheel $e^2$ is mounted on the shaft E by means of a spline, and is held into engagement with the wheel $e^2$ by a finger $b^2$, extending down in front of it from the bottom of the hopper. Said shaft E is thus allowed to be shifted by the lever $E'$ on the front of the hopper to throw the wheel $e^2$ into and out of engagement with the driving-wheel. Said lever $E'$ is pivoted between ears projecting forward from the bearing $e$ and works in a guide $b^3$ on the front side of the hopper, a projection on its side being arranged to engage with notches in said guide and secure the lever in the different positions.

The cut-off or feed-regulator F consists of a straight bar mounted in notches formed in the top of the seed-cups and arranged to slide transversely thereof, and provided with the forwardly and downwardly projecting fingers $f$, which are the width of said seed-cups and extend forward to their front walls. One of these cut-off fingers is arranged in each cup and slides in and out thereof through a suitable slot formed in its side. For a short portion of its length the bar F is formed as a rack on its rear edge, and a semicircular pinion $F'$ is pivoted to a plate $F^2$, secured to the edge of the hopper and extending out therefrom. Said pinion $F'$ is provided with a lever-handle $f'$, extending back to a convenient position to be reached, and said plate $F^2$ is formed with a curved slot near its edge, through which a set-screw $f^2$ extends into a screw-threaded perforation in said handle $f'$ for securing it in any position desired. Thus the bar F, carrying the cut-off fingers, can be moved to and secured in exactly the position desired by simply moving this handle, which, through the rack-and-pinion connection, operates said bar to secure the desired feed, when it is secured in this position by the set-screw, as described. The rear edge of this plate $F^2$ is also provided with a row of notches or indicator-marks on its edge and another row on its top face near its edge, as shown, and an indicator-finger $f^3$ is formed on the top of the handle $f'$ immediately behind said edge. The purpose of this arrangement is to indicate the amount of seed being drilled to the acre. The notches on the edge are preferably formed to indicate pecks and those on the top half-pecks. Thus when it is desired that the amount of seed being fed shall be increased or diminished the handle is moved in the proper direction, so that its indicator-finger shall pass the number of notches necessary to measure the quantity desired, and is there secured by the set-screw.

The operation of our said invention is not peculiar, except in the matter of the improved details particularly described, both as to construction and operation, and therefore any further description of the operation is not deemed necessary, it being in general of a well-known character.

Having thus fully described our said invention, what we claim as new, and desire to secure by Letters Patent, is—

1. In a grain-drill, the combination of the frame, the hopper, the seed-cups, the feed-rolls, the driving mechanism, the cut-off, and feed-regulator F, formed with a rack on its rear edge, the segmental pinion $F'$, pivoted to the plate $F^2$ on the lower edge of the hopper and formed with the handle $f'$, and the set-screw $f^2$, extending through a curved slot in the plate $F^2$ into a screw-threaded perforation in said handle, substantially as described, and for the purpose specified.

2. The combination, in a grain-drill, with the feed mechanism, substantially as described, of the cut-off and feed-regulator F, having a rack on its rear edge, the pivoted segmental pinion F', engaging therewith, and provided with the indicator $f^3$, formed on the top side thereof, and a part in front of said indicator having an indicator-gage thereon, substantially as set forth.

In witness whereof we have hereunto set our hands and seals, at Bunker Hill, Indiana, this 9th day of March, A. D. 1889.

WINFIELD W. MULLEN. [L. S.]
FRANCIS M. MULLEN. [L. S.]

Witnesses:
A. F. MARTIN,
GEO. W. BLUE.